(12) United States Patent
Pedersen et al.

(10) Patent No.: US 10,890,915 B2
(45) Date of Patent: Jan. 12, 2021

(54) SOLUTION PATH OVERLAY INTERFACES FOR AUTONOMOUS VEHICLES

(71) Applicants:Nissan North America, Inc., Franklin, TN (US); United States of America as Represented by the Administrator of NASA, Washington, DC (US)

(72) Inventors: Liam Pedersen, San Francisco, CA (US); Maarten Sierhuis, San Francisco, CA (US); Hans Utz, Campbell, CA (US); Mauro Della Penna, San Francisco, CA (US); Terrence Fong, Moffett Field, CA (US); Mark Allan, Campbell, CA (US); Maria Bualat, San Jose, CA (US); Eric Schafer, Kentfield, CA (US)

(73) Assignees: Nissan North America, Inc., Franklin, TN (US); United States of America as Represented by the Administrator of NASA, Washington, DC (US)

( * ) Notice: Subject to any disclaimer, the term of this patent is extended or adjusted under 35 U.S.C. 154(b) by 33 days.

(21) Appl. No.: 16/463,236

(22) PCT Filed: Dec. 6, 2017

(86) PCT No.: PCT/US2017/064835
§ 371 (c)(1),
(2) Date: May 22, 2019

(87) PCT Pub. No.: WO2018/106763
PCT Pub. Date: Jun. 14, 2018

(65) Prior Publication Data
US 2019/0339701 A1    Nov. 7, 2019

Related U.S. Application Data

(60) Provisional application No. 62/430,864, filed on Dec. 6, 2016.

(51) Int. Cl.
*G05D 1/02* (2020.01)
*G05D 1/00* (2006.01)
*G01C 21/36* (2006.01)

(52) U.S. Cl.
CPC ....... *G05D 1/0214* (2013.01); *G01C 21/3676* (2013.01); *G05D 1/0044* (2013.01); *G05D 2201/0213* (2013.01)

(58) Field of Classification Search
CPC ............... B60W 30/09; B60W 30/095; B60W 30/0953; B60W 30/0956;
(Continued)

(56) References Cited

U.S. PATENT DOCUMENTS 7,383,121 B2 * 6/2008 Shinada ............... G08G 1/0965
701/117
8,676,431 B1    3/2014 Mariet et al.
(Continued)

OTHER PUBLICATIONS

Extended European Search Report from corresponding application EP 17877797.5; dated Nov. 15, 2019; 10 pages.

*Primary Examiner* — Thomas G Black
*Assistant Examiner* — Sara J Lewandroski
(74) *Attorney, Agent, or Firm* — Young Basile Hanlon & MacFarlane, P.C.

(57) ABSTRACT

Methods and systems for generating a solution path overlay interface to transmit a solution path are described. The disclosed technology includes receiving vehicle data and external data from a vehicle. The vehicle data includes a vehicle location and a vehicle destination, and the external data includes a location and a movement path for each of a plurality of external objects. A solution path is determined between the vehicle location and the vehicle destination, wherein the solution path does not intersect with the plurality of external objects. A solution path overlay interface is generated that includes the vehicle traveling the solution (Continued)

path and at least some of the plurality of external objects. The solution path overlay interface is outputted for display that is configured to receive a command from an operator which results in an updated solution path that is transmitted to the vehicle for execution.

20 Claims, 9 Drawing Sheets

(58) Field of Classification Search
CPC .......... G05B 2219/40339; G05B 2219/40317; G05B 19/4061; G08G 1/16; G08G 1/161; G08G 1/162; G08G 1/163; G08G 1/164; G08G 1/165; G08G 1/166; G08G 1/167; G01C 21/34; G01C 21/3415; G01C 21/3461; G01C 21/3492; G01C 21/3602; G01C 21/2667; G01C 21/2676; G01C 21/3691; G01C 21/3694
See application file for complete search history.

(56) References Cited

U.S. PATENT DOCUMENTS

| | | | | |
|---|---|---|---|---|
| 9,174,672 B2* | 11/2015 | Zeng | ............... | B60W 30/095 |
| 9,707,961 B1* | 7/2017 | Halder | ............... | G05D 1/0257 |
| 10,093,355 B1* | 10/2018 | Wang | ............... | B62D 1/28 |
| 10,147,323 B2* | 12/2018 | Gieseke | ........... | G08G 1/096708 |
| 2009/0088966 A1* | 4/2009 | Yokoyama | ............ | G08G 1/166 |
| | | | | 701/533 |
| 2010/0082232 A1* | 4/2010 | Lee | ................... | G01C 21/3667 |
| | | | | 701/533 |
| 2010/0099353 A1* | 4/2010 | Komori | ............... | G08G 1/161 |
| | | | | 455/39 |
| 2011/0018991 A1* | 1/2011 | Watanabe | .......... | B62D 15/0275 |
| | | | | 348/118 |
| 2011/0184605 A1* | 7/2011 | Neff | ................... | G05D 1/0255 |
| | | | | 701/25 |
| 2011/0238290 A1 | 9/2011 | Feng et al. | | |
| 2011/0301800 A1* | 12/2011 | Furuno | ............... | G05D 1/0274 |
| | | | | 701/25 |
| 2012/0059545 A1* | 3/2012 | Furuno | ............... | G05D 1/0234 |
| | | | | 701/26 |
| 2012/0306663 A1* | 12/2012 | Mudalige | ............... | G08G 1/163 |
| | | | | 340/903 |
| 2014/0067206 A1* | 3/2014 | Pflug | ................... | G08G 1/163 |
| | | | | 701/41 |
| 2015/0039156 A1* | 2/2015 | Shibata | ............ | B60W 30/0953 |
| | | | | 701/1 |
| 2015/0105937 A1* | 4/2015 | Waldbauer | ............ | B60W 30/08 |
| | | | | 701/1 |
| 2015/0149088 A1 | 5/2015 | Attard et al. | | |
| 2016/0068156 A1 | 3/2016 | Horii | | |
| 2016/0139594 A1 | 5/2016 | Okumura et al. | | |
| 2016/0258775 A1* | 9/2016 | Santilli | ............... | G01C 21/3614 |
| 2016/0327950 A1* | 11/2016 | Bachrach | .................. | G06F 3/00 |
| 2017/0036771 A1* | 2/2017 | Woodman | .............. | B64D 27/26 |
| 2017/0203763 A1* | 7/2017 | Yamada | ................ | B60W 10/18 |
| 2017/0255200 A1* | 9/2017 | Arbuckle | ............... | B63H 21/21 |
| 2018/0029592 A1* | 2/2018 | Trombley | ............. | B60W 30/08 |
| 2018/0080785 A1* | 3/2018 | Han | ................... | G08G 1/096827 |
| 2018/0099665 A1* | 4/2018 | You | .................... | B60W 30/0956 |
| 2018/0101177 A1* | 4/2018 | Cohen | .................... | H04N 7/181 |
| 2018/0134315 A1* | 5/2018 | Marczok | ................... | B60R 1/00 |
| 2018/0322787 A1* | 11/2018 | Shimizu | ................. | G08G 1/165 |
| 2018/0329429 A1* | 11/2018 | Yamaguchi | .......... | G05D 1/0285 |
| 2019/0096261 A1* | 3/2019 | Hayashi | ................. | H04N 7/183 |
| 2019/0251851 A1* | 8/2019 | Zhao | ..................... | G05D 1/106 |

* cited by examiner

SOLUTION PATH OVERLAY INTERFACES FOR AUTONOMOUS VEHICLES

CROSS-REFERENCE TO RELATED APPLICATION(S)

This application claims priority to and the benefit of U.S. Provisional Application Ser. No. 62/430,864, filed Dec. 6, 2016, the entire disclosure of which is hereby incorporated by reference.

TECHNICAL FIELD

This application relates generally to autonomous vehicles, and more particularly to solution path overlay interfaces for autonomous vehicle operation.

BACKGROUND

The use of autonomous vehicles has not eliminated the occurrence of situations (e.g., construction zones) that can delay or obstruct transit of the vehicles. Resolution of such situations can be expedited through the use of human vehicle operators, who can guide the vehicle by using their understanding of the environment in which the vehicle is operating. This understanding depends on information about the environment, which can be conveyed to the human operator in a variety of ways including verbal descriptions (e.g., a phone call from a stranded driver seeking assistance), or positional information (e.g., geographic coordinates to determine vehicle location). However, such information does not provide an adequate representation of the many factors that could have an impact on the efficient and safe operation of the vehicle.

SUMMARY

Disclosed herein are aspects, features, elements, implementations, and implementations for generation of solution path overlay interfaces.

An aspect of the disclosed implementations includes a method for generating a solution path overlay interface to transmit a solution path to a vehicle. The method comprises: receiving, by a solution path overlay system, vehicle data and external data from a vehicle control system of the vehicle, the vehicle data being associated with the vehicle and including a vehicle location and a vehicle destination, the external data including a location and a movement path for each of a plurality of external objects; determining, by the solution path overlay system, a solution path between the vehicle location and the vehicle destination using the vehicle data and the external data, the solution path not intersecting with the plurality of external objects; generating, by the solution path overlay system, a solution path overlay interface that includes a representation of the vehicle traversing along the solution path and at least some of the plurality of external objects; outputting, by the solution path overlay system, the solution path overlay interface for display configured to receive a command from an operator of the solution path overlay interface; in response to receiving the command from the operator of the solution path overlay interface, updating, by the solution path overlay system, the solution path overlay interface according to the received command to provide an updated solution path; and transmitting, by the solution path overlay system, the updated solution path to the vehicle for execution.

An aspect of the disclosed implementations includes a solution path overlay system comprising a memory and a processor configured to execute instructions stored in the memory to: receive vehicle data and external data from a vehicle control system of a vehicle, the vehicle data being associated with the vehicle and including a vehicle location and a vehicle destination, the external data including a location and a movement path for each of a plurality of external objects; determine a solution path between the vehicle location and the vehicle destination using the vehicle data and the external data, the solution path not intersecting with the plurality of external objects; generate a solution path overlay interface that includes a representation of the vehicle traversing along the solution path and at least some of the plurality of external objects; output the solution path overlay interface for display configured to receive a command from an operator of the solution path overlay interface; in response to receiving the command from the operator of the solution path overlay interface, update the solution path overlay interface according to the received command to provide an updated solution path; and transmit the updated solution path to the vehicle for execution.

An aspect of the disclosed implementations includes a non-transitory computer-readable storage medium including program instructions executable by one or more processors of a solution path overlay system that, when executed, cause the one or more processors to perform operations, the operations comprising: receiving vehicle data and external data from a vehicle control system of a vehicle, the vehicle data being associated with the vehicle and including a vehicle location and a vehicle destination, and the external data including a location and a movement path for each of a plurality of external objects; determining a solution path between the vehicle location and the vehicle destination using the vehicle data and the external data, the solution path not intersecting with the plurality of external objects; generating a solution path overlay interface that includes a representation of the vehicle traversing along the solution path and at least some of the plurality of external objects; outputting the solution path overlay interface for display configured to receive a command from an operator of the solution path overlay interface; in response to receiving the command from the operator of the solution path overlay interface, updating the solution path overlay interface according to the received command to provide an updated solution path; and transmitting the updated solution path to the vehicle for execution.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
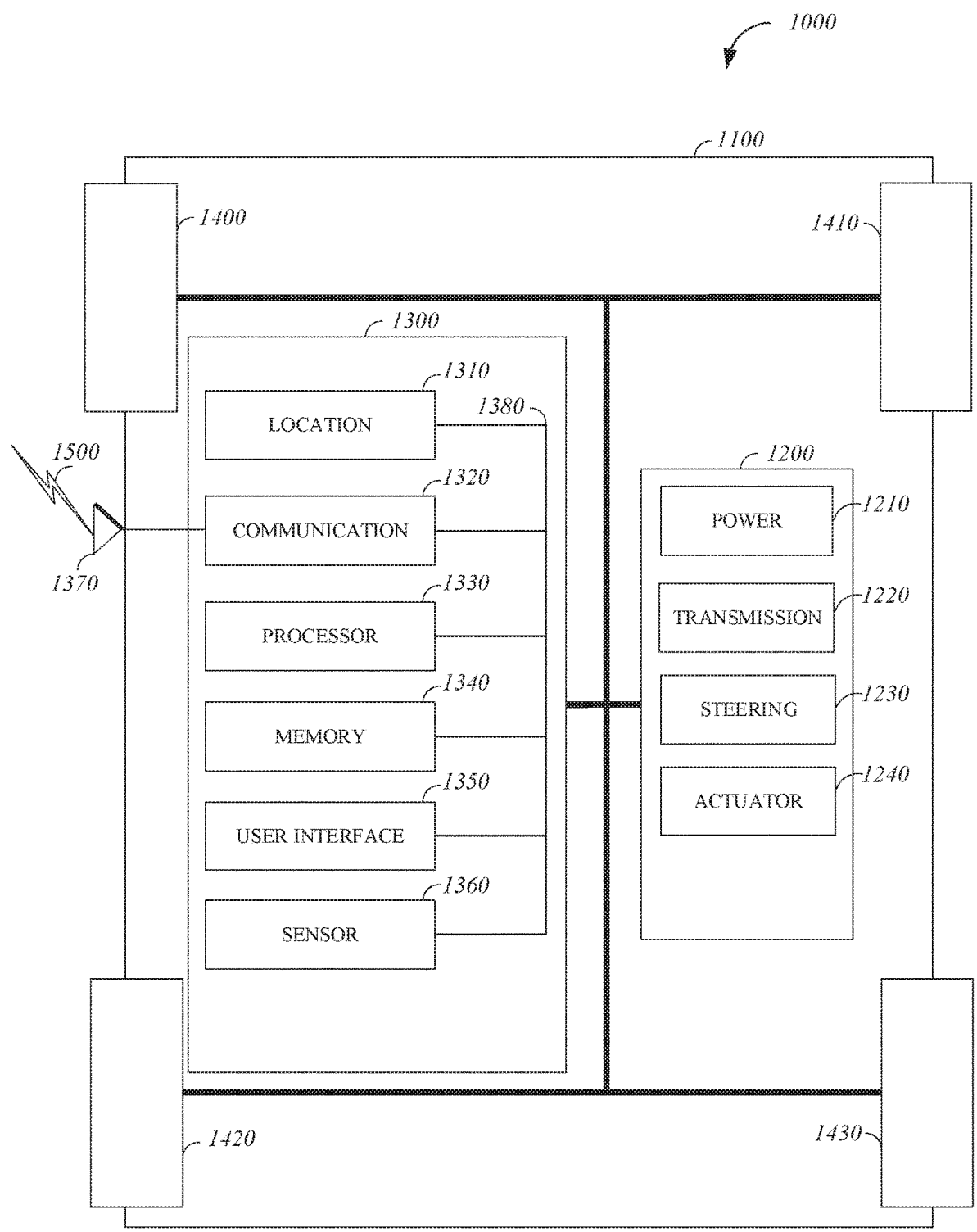
FIG. 1 is a diagram of an example of a portion of a vehicle in which the aspects, features, and elements disclosed herein may be implemented.

The way in which vehicles (e.g., autonomous vehicles, human driven vehicles, and semi-autonomous vehicles) and their surrounding environment is represented can impact the effectiveness with which the vehicle is operated, such as by human drivers within the vehicles, by human remote operators, or even by non-human remote operators. An easily understood representation of the vehicle and its surrounding environment can enhance the effectiveness of assistance that is provided, especially when the vehicle is obstructed or delayed by external objects (e.g., construction zones, stalled vehicles, fallen trees, etc.).

The present disclosure and disclosed technology provides a way to address the problem of ineffective representation of vehicles and external objects by generating a solution path overlay interface to assist the operator of the vehicle. By providing indications of a solution path for a vehicle through an environment, such as an environment with challenging road conditions including but not limited to road detours, a local or remote human or non-human operator is presented with useful information to assist in the efficient operation (such as the tele-operation) of the vehicle.

The disclosed technology facilitates safe navigation of the vehicle through the environment by identifying external objects and distinguishing between immovable objects (e.g., buildings), and moveable objects (e.g., pedestrians, vehicles). Further, the disclosed technology can determine regulated traffic flow patterns (e.g., the flow of traffic in accordance with traffic regulations and current conditions) which can be used in the determination of solution paths in environments in which roadways with regulated traffic flow are limited or unavailable (e.g., construction zones that temporarily reroute traffic flow into opposite direction lanes against regulated traffic flow patterns). In this way, the situational awareness of vehicle operators can be improved through usage of the solution path overlay interface, thereby resulting in more efficient and safe vehicle operation.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to generation of solution path interfaces, for example, those concerning the extension of computer network components to remotely monitor and tele-operate autonomous vehicles. The development of new ways to monitor autonomous vehicle network resources to, for example, identify system or vehicle impairments and indicate requiring management or attention and communicating instructions or information between the monitoring devices and the vehicles is fundamentally related to autonomous vehicle related computer networks.

Implementations of this disclosure provide at least a system, an apparatus, non-transitory computer readable media, and a method for the generation of a solution path overlay interface. The system includes receiving vehicle data and external data associated with a vehicle, for example from a remote data source (e.g., remote vehicle monitoring server) through a communication system in the vehicle. The vehicle data can relate to the state of the vehicle, including the vehicle's location, intended destination, and operational status. The external data can relate to the state of external objects, including the locations of the external objects and movement paths of the external objects (e.g., routes that the external objects have travelled and are predicted to travel). The system determines a path, such as a solution path, between the location of the vehicle (vehicle location) and the destination of the vehicle (vehicle destination) that does not intersect with or come in close proximity to the external objects (e.g., the vehicle avoids physical contact with external objects including pedestrians and roadside barriers or the vehicle avoids coming within a predetermined area or proximity with the external objects). Further, the system generates a solution path overlay interface that displays the solution path to an operator of the vehicle. For example, the system can generate, as the solution path overlay interface, a graphical representation of the vehicle, the external objects within a predetermined area of the vehicle, and the determined solution path from the current vehicle location to a destination.

To describe some implementations in greater detail, reference is made to the following figures.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
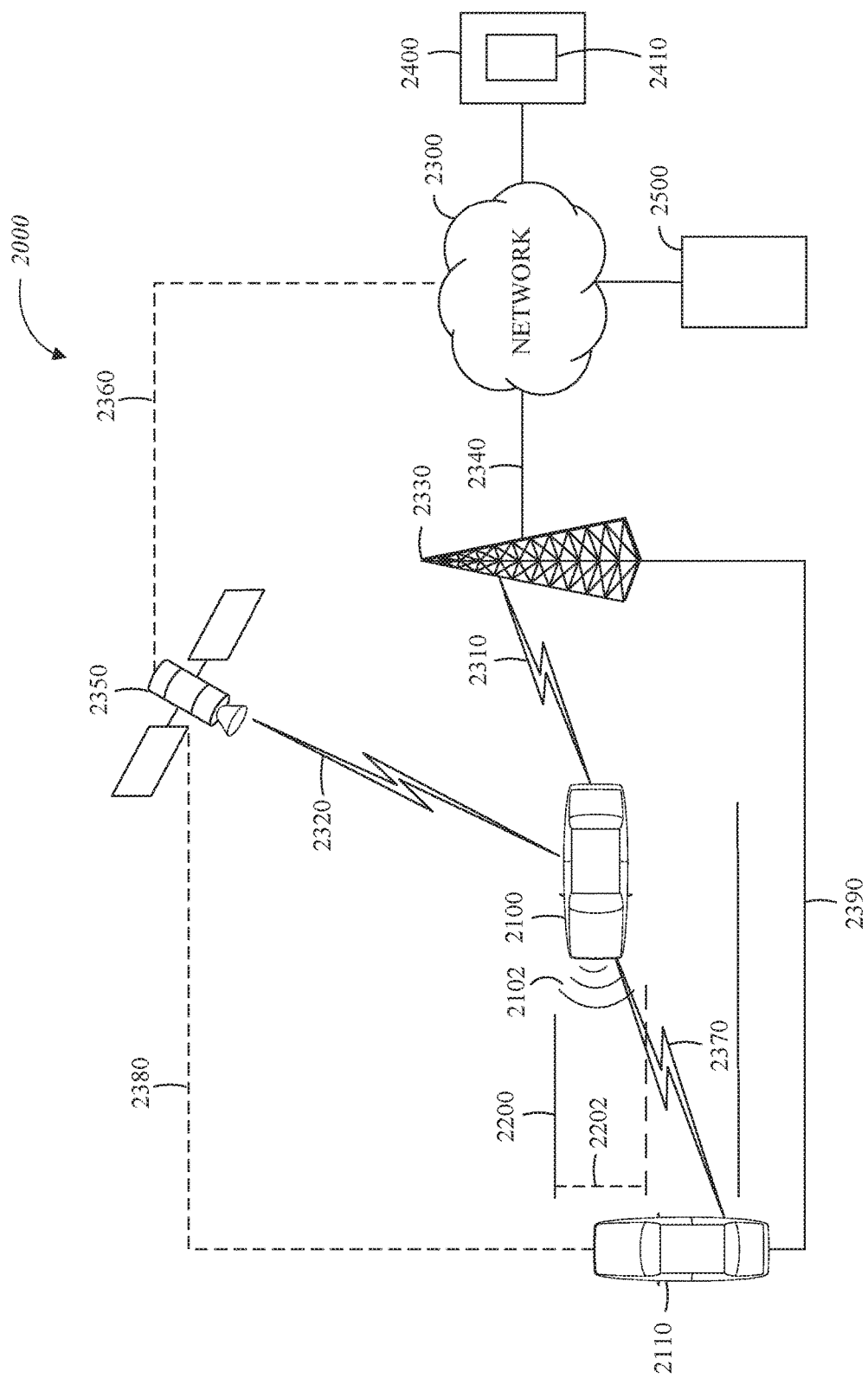
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
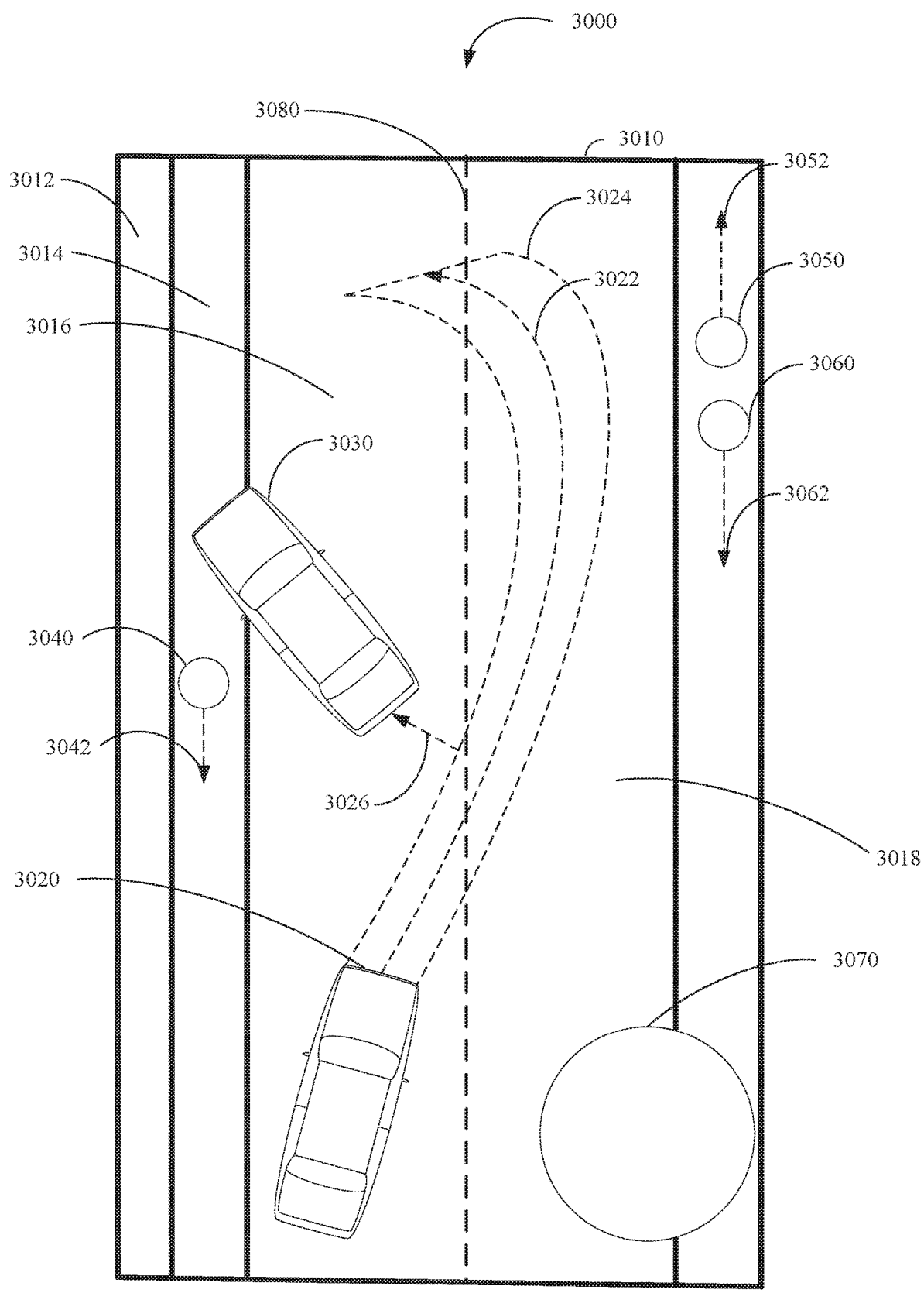
FIG. 3 is a diagram illustrating an example of a solution path overlay interface in accordance with the present disclosure.

FIG. 3 is a diagram illustrating an example of a solution path overlay interface 3000 in accordance with the present disclosure. The solution path overlay interface 3000 can be generated based on one or more instructions that are executable on a computing apparatus, including the controller apparatus 2410 shown in FIG. 2, and which can be stored in a memory of a computing apparatus, including the controller apparatus 2410. For example, the solution path overlay interface 3000 can be generated by the controller apparatus 2410, based on instructions that are interpreted by a client computing device that accesses the controller apparatus 2410 through a computer network. The client computing device can then generate a representation of the solution path overlay interface 3000 on a display device.

In an implementation, the solution path overlay interface 3000 includes an environment representation 3010, an unpaved surface indicator 3012, a walkway indicator 3014, a roadway portion indicator 3016, a roadway portion indicator 3018, a vehicle indicator 3020 that can represent a vehicle that will follow a solution path, a solution path indicator 3022 (also referred to as a solution path), a solution path overlay indicator 3024 (also referred to as a solution path overlay), a buffer distance 3026, an external object indicator 3030 which represents another vehicle in this implementation but could be another external object including but not limited to a fallen tree, external object indicators 3040/3050/3060 which represent pedestrians, movement path indicators 3042/3052/3062 which represent movement paths for the external object indicators 3040/3050/3060 respectively, an external object indicator 3070 which represents a construction zone, and a lane marker indicator 3080 which represents lane division markings.

The environment representation 3010 includes a representation of a plurality of objects, including the vehicle indicator 3020 and the external object indicators 3040/3050/3060/3070 of a plurality of external objects. The representation of the objects can be based on data relating to the state or condition (e.g., appearance, direction of movement, identity) of actual objects within an actual geographical area. For example, the objects can include vehicles, including the vehicle 2100 shown in FIG. 2. The objects can be represented as indicators such as the vehicle indicator 3020, which can be generated as a variety of images including but not limited to static images, dynamic images, moving images, a real-time stream of images or video, or any combination thereof. Further the features and characteristics of objects within the geographical area represented by the environment representation 3010 can be based on the actual appearance of the objects that can be obtained or received from remote data sources or sensors (e.g., satellite images, vehicle sensor images, traffic signal camera images). Moreover, objects can be represented in the environment representation 3010 as images including indicators or other symbolic representations including icons, text, pictograms, or any combination thereof.

The environment representation 3010 can receive input including any of touch inputs (e.g., touching a touch screen such as a capacitive display), voice inputs (e.g., speaking into a microphone), and inputs from an input device (e.g., keyboard or stylus). Based on the input, the environment representation 3010 can modify the way that images within the environment representation 3010 appear including but not limited to: magnification of some or all of the images (e.g., increasing the size of a subset of the plurality of external objects or zooming into the area that is displayed within the environment representation 3010); shrinking some or all of the objects, including zooming out from the area that is represented; changing the viewing angle, including changing to an overhead view (e.g., map view).

The solution path indicator 3022 can include a representation of a solution path that a vehicle such as the vehicle represented by the vehicle indicator 3020 can travel from a current location to a destination. For example, the solution path indicator 3022 can include a path that the vehicle represented by the vehicle indicator 3020 will travel without making physical contact with the other vehicle represented by the external object indicator 3030 or any of the other external objects (some shown and others potentially not shown). In another implementation, the solution path indicator 3022 determines the path based on other predetermined constraints other than physical contact including but not limited to ensuring that the vehicle does not come within a certain proximity of the external objects.

The solution path overlay indicator 3024 can represent the outer edges of a solution path (such as the solution path indicator 3022) that is based on the width of a vehicle represented by a vehicle indicator, such as the vehicle indicator 3020, or that is based on another predetermined distance. The buffer distance 3026 can represent a distance between the outer edges of the solution path overlay indicator 3024 and a vehicle (e.g., the vehicle represented by the vehicle indicator 3020) or the buffer distance 3026 can be determined based on predetermined preferences and operator selections. In some embodiments, the buffer distance 3026 can be incorporated into the solution path overlay indicator 3024 so that the width of the solution path overlay indicator 3024 (e.g., the width of the vehicle) is increased in relation to the size of the buffer distance.

Different types of surfaces can be represented within the environment representation 3010 including, but not limited to: unpaved surfaces, including an unpaved surface represented by the unpaved surface indicator 3012 (e.g., representing a strip of grass or a dirt portion); and paved surfaces, including paved surfaces represented by the walkway indicator 3014 (representing a sidewalk), and the roadway portion indicator 3016 (representing a lane of a road). Furthermore, the surfaces can be demarcated by road indications such as the lane marker indicator 3080 which represents lane division markings. The lane division markings can help to distinguish the direction of travel in the roadway portion indicator 3016 from the (opposite) direction of travel in the roadway portion indicator 3018 or the lane division markings can help to distinguish lanes for turning versus lanes for proceeding.

Furthermore, the environment representation 3010 can include various indications (not shown) that relate to states or conditions of the surfaces including but not limited to: environmental condition indicators (e.g., indications of snow or rain on a roadway); road condition indicators associated with portions of the geographical area that are broken, uneven, or have indentations (e.g., potholes); hazard indicators based on surface hazards including oils or other slippery materials; and loose surface indicators based on loose surfaces (e.g., loose gravel, sand). In some implementations, the environment representation 3010 can include representations of signage (e.g., stop signs, yield signs, speed limit signs).

External object indicators, including the external object indicators 3040/3050/3060/3070, can be used to represent any type of object including, but not limited to: animate objects, including pedestrians, wildlife, or domestic animals; and inanimate objects including moveable objects such as vehicles and bicycles, and immovable objects such as buildings. Indicators, including the external object indicators 3040/3050/3060 that are moveable can also be associated with path indicators such as the movement path indicators 3042/3052/3062 that correspond to the external object indicators 3040/3050/3060. Path indicators can indicate a past or predicted course of travel by an external object. For example, the intersection of two or more path indicators can be used to indicate that two or more external objects will, if the paths are not changed, come into contact with one another at a future time or will come into a dangerous close enough distance with one another. The path indicators can be used to indicate different motion patterns including but not limited to linear motion (e.g., straight line motion by an object), circular or elliptical motion (e.g., an object travelling around a circuit), or reciprocal motion (e.g., back and forth movements by an object).

The external object indicator 3070 can represent a construction zone, the boundary of which can be formed by a collection of external objects such as pylons or cones or signage used to indicate the construction zone. In some embodiments, moveable objects, such as plastic pylons can be represented in the same manner as immovable objects such as large concrete pillars. Accordingly, a safe zone can be represented around areas in which pedestrians are likely to be found. The external object indicator 3070 can also represent other road issues such as large potholes that require rectification.

In some implementations, the visual representations in the solution path overlay interface 3000 can be associated with other sensory outputs including, but not limited to, audio outputs (e.g., sound output through speakers) and haptic outputs (e.g., vibrations or other tactile outputs through a haptic output device). For example, an external object, such as the external object indicator 3030, that is represented as obstructing the path of the vehicle indicator 3020 can be represented by a picture of a vehicle with a pulsating red color that is accompanied by an audio tone (e.g., a chime) that sounds in time or alternatively with the pulsating red color. Accordingly, an operator's attention may be immediately drawn to the obstructive object represented by the external object indicator 3030 to enable the vehicle represented by the vehicle indicator 3020 to be rerouted to avoid potential issues.

Figure 4:
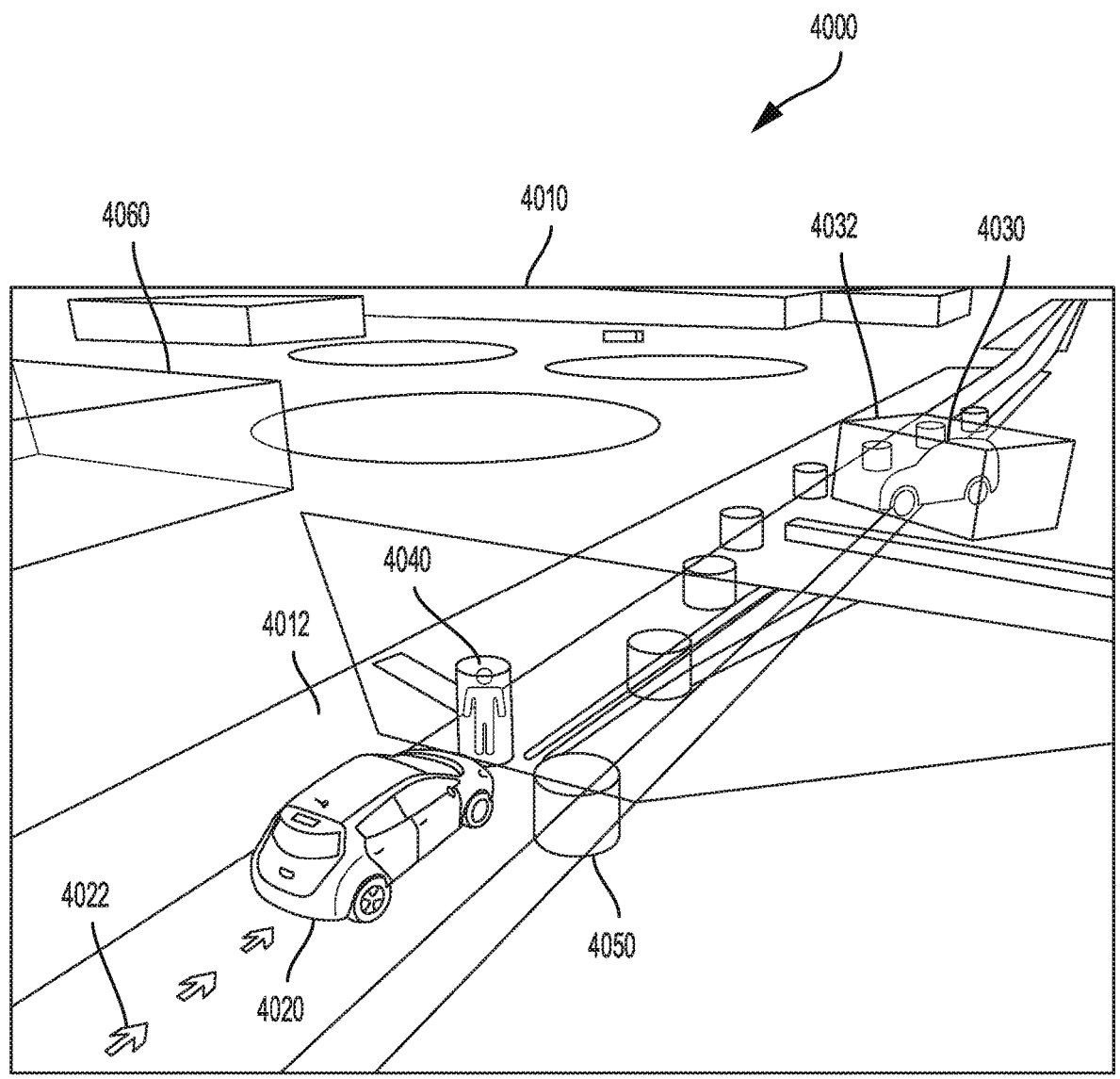
FIG. 4 is a diagram illustrating an example of a solution path overlay interface in accordance with the present disclosure.

FIG. 4 is a diagram illustrating an example of a solution path overlay interface 4000 in accordance with the present disclosure. The solution path overlay interface 4000 includes three-dimensional representations of a vehicle and external objects. The solution path overlay interface 4000 can be generated based on one or more instructions that are executable on a computing apparatus, including the controller apparatus 2410 shown in FIG. 2, and which can be stored in a memory of a computing apparatus, including the controller apparatus 2410. For example, the solution path overlay interface 4000 can be generated by the controller apparatus 2410, based on instructions that are interpreted by a client computing device that accesses the controller apparatus 2410 through a computer network. The client computing device can then generate a representation of the solution path overlay interface 4000 on a display device.

The solution path overlay interface 4000 includes an environment representation 4010, a roadway portion indicator 4012, a vehicle indicator 4020 that can represent the vehicle that will follow a solution path, a solution path indicator 4022 (also referred to as a solution path), an external object indicator 4030 that can represent another vehicle, an external object boundary indicator 4032, an external object indicator 4040 that can represent a pedestrian, an external object indicator 4050 that can represent an obstruction, and an external object indicator 4060 that can represent a building. In another implementation, the external object indicators 4030/4040/4050/4060 can be different external objects or combinations of the aforementioned external objects.

The environment representation 4010 includes a representation of a vehicle, such as the vehicle indicator 4020, or external objects within a predetermined area around (e.g., based on a predetermined radius from the vehicle) or a predetermined distance of the vehicle (e.g., based on being at least 10 feet away from the vehicle). The environment representation 4010 can use three-dimensional models of the vehicle and external objects which can be symbolic (e.g., a cube to represent a vehicle or a cylinder to represent a pedestrian) or based on, or used in conjunction with, actual images including still images (e.g., photographs) or moving images (e.g., video such as live video streams).

For example, the vehicle indicator 4020 can be based on a three-dimensional model of an automobile without use of any still or moving imagery, and the roadway portion indicator 4012, which represents a roadway, can be based on a three-dimensional model of a roadway with surface textures based on still images of a roadway at the corresponding actual geographical location (e.g., the lane markers will match the lane markers at the actual geographical location). Further, the external object indicator 4060 can be based on a three-dimensional model of a building with surface textures based on still images of a building at a different geographical location, and the external object indicator 4050, which represents a roadside obstruction (e.g., a concrete barrier), could be based on real-time still or video imagery of a roadside obstruction.

A solution path indicator, such as the solution path indicator 4022, can be used to represent a portion of a solution path that a vehicle has previously travelled or that the vehicle will travel. The solution path indicator can include one or more solution paths between a vehicle location and a destination. For example, a solution path can be used to direct or guide a vehicle, such as the vehicle represented by the vehicle indicator 4020, to a destination in a way that avoids physically contacting external objects. For example, the solution path indicator 4022 can be used to assist in guiding a vehicle corresponding to the vehicle indicator 4020, around external objects, such as the external object indicator 4030, the external object indicator 4040, and the external object indicator 4050, that obstruct or delay the movement of the vehicle indicator 4020 along a path to a destination.

An external object boundary indicator, such as the external object boundary indicator 4032 that is generated around the external object indicator 4030, can be used to indicate an area around an external object that, though not representative of a tangible physical object, can be used to represent an area through which the vehicle indicator 4020 should not intersect or come into close proximity with (e.g., the vehicle represented by the vehicle indicator 4020 should not travel through the area defined by the external object boundary).

The steps, or operations, of any method, process, technique, or algorithm described in connection with the implementations of the disclosed technology herein, may be implemented in hardware, firmware, software executed by hardware, circuitry, or any combination thereof. To facilitate explanation, the techniques 5000-8000, shown in FIGS. 5-8, are depicted and described as a series of operations. However, the operations in accordance with this disclosure can occur in various orders or concurrently. Additionally, operations in accordance with this disclosure may occur with other operations not presented and described herein.

Figure 5:
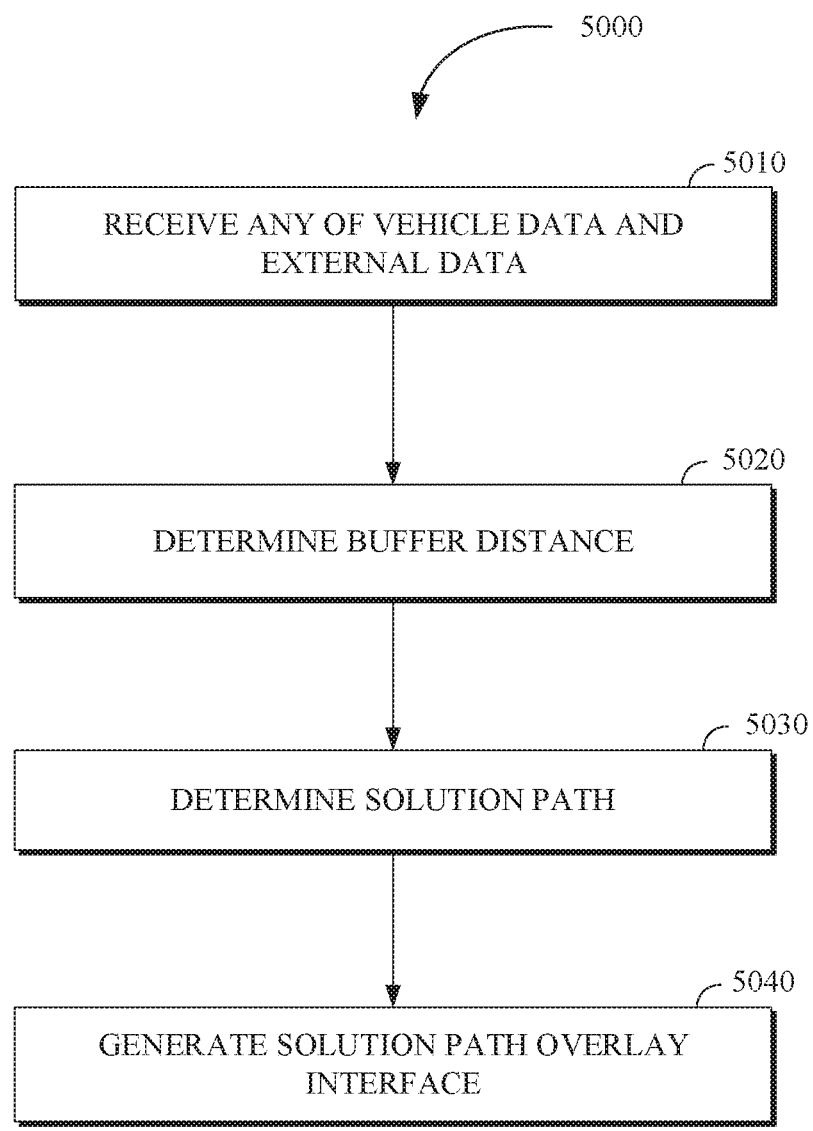
FIG. 5 is a flow chart of a technique for generating a solution path overlay interface in accordance with the present disclosure.

FIG. 5 is a flow chart of a technique 5000 for generating solution path overlay interfaces in accordance with the present disclosure. The technique 5000 is utilized by a system for generating solution path overlay interfaces. Some or all of the technique 5000 for generating solution path overlay interfaces may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 5000 for generating solution path overlay interfaces can be implemented in a system combining some or all of the features described in this disclosure.

At operation 5010, any of vehicle data and external data are received by, for example, a communication system or other device of the system for generating solution path overlay interfaces. For example, the vehicle data can be received from one or more vehicles including a device or apparatus (e.g., a conveyance) that can travel from one location to another location and transport objects including any of a passenger and cargo. The one or more vehicles can include an autonomous vehicle, a vehicle that is driven by a human driver, or a semi-autonomous vehicle.

The vehicle data can be associated with the condition or state of a vehicle or surrounding vehicles (e.g., vehicles that are surrounding to the vehicle being tele-operated) and can include but is not limited to: kinetic data relating to any of the velocity and acceleration of a vehicle; location data, including a location of the vehicle such as the geographical location of the vehicle (e.g., the latitude and longitude of the vehicle), the location of the vehicle with respect to another object, or the location of the vehicle with respect to a type of area (e.g., school zone, fire lane, parking lot); vehicle position data, including the orientation and inclination (e.g., slope of the vehicle on an incline) of the vehicle; operational data relating to the operational state of the vehicle, including the electrical state or mechanical state of the vehicle (e.g., health of the electrical vehicle systems, mechanical vehicle systems, tire pressure, etc.); maintenance data associated with ongoing maintenance of the vehicle including scheduled tune-ups; vehicle energy state data, including an amount of fuel remaining or an amount of battery charge remaining; sensor data including vehicle sensor data based on outputs from sensors including, optical sensors (e.g., light detection and ranging sensors), audio sensors, and motion sensors, the sensor data can be used to generate a representation of the physical environment in and around the vehicle; internal state data, including a temperature and humidity inside the passenger cabin of the vehicle; current task data associated with a current task (e.g., drop off a passenger) of the vehicle including an estimated time for completion of the current task; and destination data associated with a destination of the vehicle, including one or more routes that the vehicle can traverse to arrive at the destination.

In some implementations, the vehicle data can be used to determine traffic conditions including the movement of external objects within a predetermined area (e.g., an area around the vehicle or a specified geographic area). Based on the traffic conditions, a vehicle route associated with the destination can be determined and/or adjusted. The destination itself can also be changed if for example, the destination of a drop-off location is in a high traffic congestion area. For example, the vehicle route to a destination can avoid intersecting an area in which traffic conditions (e.g., high level of congestion of external objects) would delay or obstruct transit of the vehicle to the destination.

The external data can be associated with the condition or state of objects external to the vehicle which can include but is not limited to any of buildings, roadways, walkways, waterways, vehicles, cyclists, and pedestrians. The external data can include, but is not limited to: external object movement path data, including a path previously travelled by an external object and predicted paths of the external object, either of which can be based on the external objects velocity, orientation, location, or an external object movement path that is transmitted in the external data; external object orientation data, including any of an orientation of the external object relative to the vehicle and an orientation such as a compass orientation; external object location, including the geographical position of an external object (e.g., the latitude and longitude of the external object); external object identity profile data to identify an external object (i.e., to distinguish an external object from other external objects); sensor data including external object sensor data based on outputs from sensors including, optical sensors including light detection and ranging sensors (LIDAR), audio sensors, and motion sensors, the sensor data can be used to generate a representation of the physical environment in and around the external objects; surface state data including the state of a surface (e.g., a road) within a predetermined area (e.g., a predetermined area around the vehicle); traffic signal data indicating the state of traffic signal lights (e.g., green light, red light, amber light); road closure data, including current and anticipated road closures and detours; construction data including the location and state of current and anticipated construction sites; emergency vehicle route data, including the route of emergency vehicles such as ambulances, and police vehicles; infrastructure data, including the location of buildings; environmental data including the state of current and upcoming weather conditions (e.g., snow or rain forecasts); and zoning data including the locations of businesses, schools, or residential areas.

At operation 5020, for each portion of the solution path or the entire solution path, a buffer distance between the vehicle and the external objects is determined. In other words, the buffer distance can either dynamically change based on the portion of the solution path or can be the same distance throughout the solution path. To accommodate passage of the vehicle past external objects, the width of the solution path can be based on the distance between objects on either side of the vehicle. The buffer distance between the vehicle and the external objects can include a distance in addition to the minimum distance that permits passage of the vehicle between objects on either side of the vehicle and can be in any direction including the x, y, and z axes. For example, a buffer distance of three meters on either side of the solution path could offer a safety margin for movement of the vehicle past the external objects so that the vehicle can have more time to react to unexpected movements by the external objects.

The buffer distance can be used to increase the distance around the surface of the vehicle. In this way, the vehicle is better able to avoid physical contact (e.g., collisions) with external objects. In some embodiments, a default buffer distance can include a predetermined buffer distance that is added to any of the width of the solution path, the surface of the vehicle, or the surface of the external objects. The buffer distance can be dynamically updated based on machine learning techniques that aggregates data associated with the required distances to safely pass similar external objects.

For example, when the vehicle moves from an open space (e.g., an outdoor roadway) to an enclosed space (e.g., a covered parking garage or a tunnel), a path between the vehicle location (e.g., on the roadway) and the destination (e.g., a parking space in the covered parking garage) will use the buffer distance to ensure that the top surface of the vehicle (or cargo that is being carried by the vehicle) does not contact the lower edge of the covered parking garage ceiling.

In some embodiments, a predetermined buffer distance can be determined for each of the external objects. For example, if an external object, such as a truck, has dimensions including a height of 1.4 meters, a width of 2.8 meters, and a length of 4.8 meters, a buffer distance of 0.5 meters can be added to some or all of the dimensions so that an additional distance from other external objects can be maintained. By determining a buffer distance, the vehicle is afforded an additional distance to accommodate unexpected or eccentric movements by the vehicle or the external objects. The buffer distance can be predetermined (e.g., always set to at least 0.5 meters) or can be dynamically adjusted.

At operation 5030, one or more paths, including movement paths of the external objects and at least one solution path between the location of the vehicle and the destination are determined. The solution path of the vehicle includes a path that the vehicle can travel through without intersecting (e.g., physically contacting) or coming into close proximity to any of the external objects and can be determined based on any of the vehicle data and the external data.

The external data can be used to determine the external objects that are moveable and currently moving (e.g., vehicles in motion), external objects that are moveable and not currently moving (e.g., vehicles stopped at a red light traffic signal), and external objects that are immovable (e.g., buildings). Movement paths including current movement paths and anticipated movement paths of the external objects can be determined based on the external data including velocities and trajectories of the external objects which can be used to determine the position of the external objects over a period of time. Based on the current movement paths and the anticipated movement paths of the external objects, a solution path that does not intersect or come in close proximity (e.g., within a predetermined distance defined as 'close') the current movement paths and anticipated movement paths can be determined. In some embodiments, the solution path can be based on a path-finding algorithm that is used to calculate the shortest path between the vehicle location and a destination that does not intersect with or come in close proximity to the movement paths of the external objects.

For example, using the location of the vehicle and the movement paths of the external objects, a solution path between the location of the vehicle and the destination can be associated with geographic coordinates and based on the changes over time of the location of the vehicle and the external objects the solution path can be determined.

In some implementations, a direction of regulated traffic flow is determined based on any of traffic flow data and traffic flow indicators within the predetermined distance of or area around the vehicle. The traffic flow data can include authorized traffic flow patterns for the external objects. For example, the traffic flow data can include: traffic pattern data, including the regulated direction of traffic flow for a portion of a roadway (e.g., the legally defined side of the road that a vehicle can travel on in a particular direction); traffic signal light state data, including an indication of the state of traffic signal lights (e.g., an indication of whether a traffic signal light is red, green, or yellow); and traffic speed regulation data, including an indication of speed limits for traffic within an area. The direction of regulated traffic flow can be used as a constraint on generating the solution path (e.g., the solution path can partly or completely avoid intersecting a portion of a roadway that violates the regulated traffic flow).

At operation 5040, a solution path overlay interface including or displaying the solution path is generated. The solution path overlay interface includes the solution path between the current location of the vehicle and the destination and can include a representation of an area within a predetermined distance of the vehicle, the vehicle, and the solution path between the vehicle and the destination.

The solution path overlay interface can be generated on a display device and can include representations of the vehicle, the external objects, and the geographical area (e.g., a specified area, such as a region, or a radius around the vehicle) as images associated with the state or condition (e.g., appearance, direction of travel, external object identity). The objects can be represented as images including indicators or other symbolic representations including icons, text, pictograms, or any combination thereof. Further, the images can include images still non-moving images, moving images, previously recorded images, and real-time images including a stream of images, or any combination thereof. Examples of solution path overlay interfaces have been previously illustrated in FIGS. 3 and 4.

In some implementations, the solution path overlay interface can include a combination of images based on sensor outputs from the vehicle data or the external data (e.g., video images) and images that are superimposed over the images based on the sensor outputs. For example, optical sensors in the vehicle or in the external objects can output a video stream which can be included in the respective vehicle data or external data. The video stream can be used as a backdrop for the solution path overlay interface that can be combined with generated portions of the solution path overlay interface.

In some implementations, generating the solution path overlay interface includes generating a surface image that includes a surface state indication based on the surface state (which can be based on the surface state data in the external object data or the determined based on the sensor data).

Figure 6:
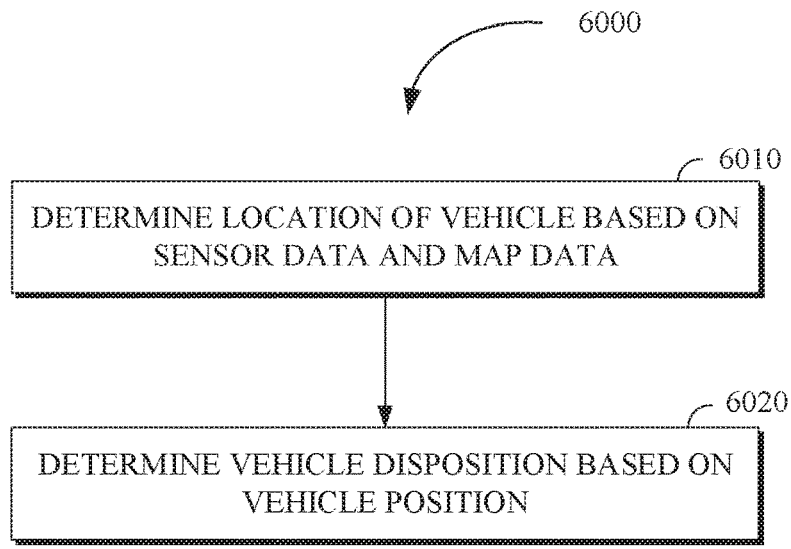
FIG. 6 is a flow chart of a technique for generating a solution path overlay interface in accordance with the present disclosure.

FIG. 6 is a flow chart of a technique 6000 for generating solution path overlay interfaces in accordance with the present disclosure. The technique 6000 is utilized by a system for generating solution path overlay interfaces. Some or all of the technique 6000 for generating solution path overlay interfaces may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 6000 for generating solution path overlay interfaces can be implemented in a system combining some or all of the features described in this disclosure.

At operation 6010, a location of the vehicle is determined based on any of the sensor data (e.g., sensor output from sensors including optical sensors, audio sensors, light detection and ranging sensors, and motion sensors) included in the vehicle data or the external data, and map data. The map data can be included in any of the vehicle data or the external object data and can include the state of a geographical area (e.g., topographical state, roadways, walkways, waterways) in which the vehicle is located (e.g., a map of the city or region in which a vehicle is located).

The map data can include a representation of a predetermined area that includes any of the vehicle and the external objects, and that is received from a source that does not include the vehicle or the external objects. For example, the map data can be locally stored or received from a remote computing device (e.g., a geographical map server) that can store and exchange (send or receive) map data relating to a geographical area.

At operation 6020, a vehicle disposition is determined based on the vehicle position. The vehicle disposition can be based on any of the map data and the sensor data. The vehicle disposition can include data relating to a position of the vehicle in relation to external objects including, but not limited to: an angle of incline for the vehicle with respect to the surface beneath the vehicle; an indication of the level of traction for the vehicle's wheels with respect to the surface beneath the wheels; and an indication of whether the vehicle is positioned in accordance with the direction of regulated traffic flow (e.g., whether the vehicle is moving in the opposite direction of a traffic lane).

In some implementations, the solution path overlay can be based on the vehicle disposition and can include the indicators of the vehicle disposition. For example, in a situation in which the vehicle is on a muddy slope, a plain video image may not fully convey the angle of the slope or the extent to which the mud reduces the traction of the vehicle's wheels. In this way, the vehicle disposition can be used as part of the solution path overlay interface to provide a visual indication of the state of the road surface including the slope and the traction reducing mud.

Figure 7:
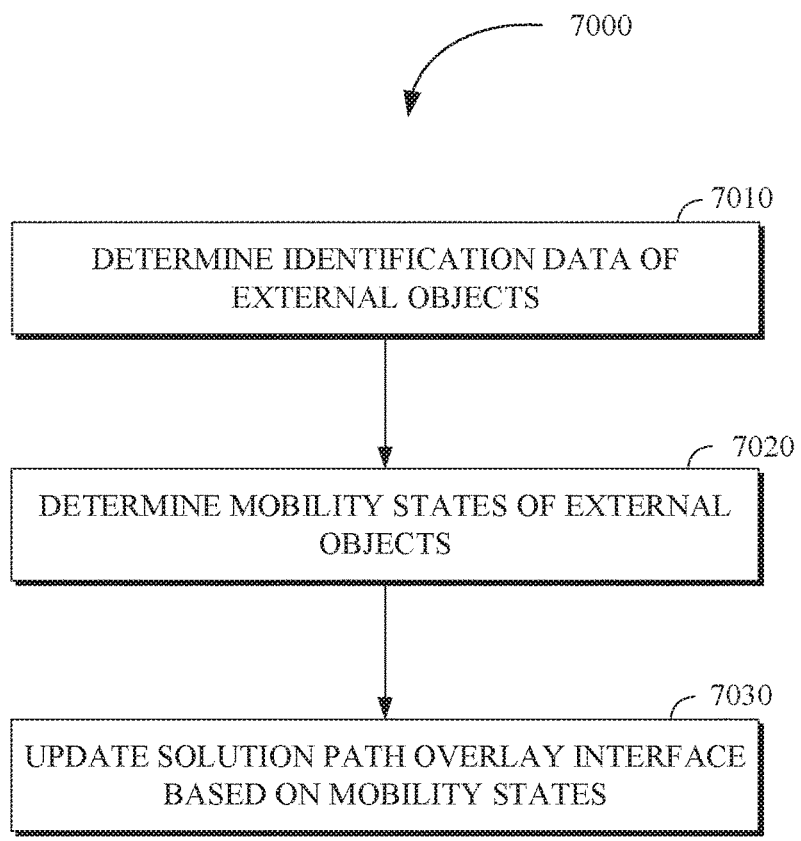
FIG. 7 is a flow chart of a technique for generating a solution path overlay interface in accordance with the present disclosure.

FIG. 7 is a flow chart of a technique 7000 for generating solution path overlay interfaces in accordance with the present disclosure. The technique 7000 is utilized by a system for generating solution path overlay interfaces. Some or all of the technique 7000 for generating solution path overlay interfaces may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 7000 for generating solution path overlay interfaces can be implemented in a system combining some or all of the features described in this disclosure.

At operation 7010, identities (or identification data/information) corresponding to each of the external objects can be determined based on any of the vehicle data and the external object data. Determination of the identities of the external objects can be performed by comparing and matching the vehicle data or the external object data to a plurality of external object identity profiles that can include characteristics of the respective external objects. The characteristics of the external objects can be based on visual characteristics (e.g., which can be determined based on optical sensors), sound characteristics which can be determined based on the output from sound sensors (e.g., microphones), motion characteristics which can be determined by motion sensors, or any combination thereof.

For example, visual data from an optical sensor can be used to compare characteristics including the color, shape, size, or movement pattern, of an external object to corresponding characteristics of a plurality of external object profiles. The identity of the external object can be determined to correspond to the external object profile that most closely matches the characteristics of the external object.

Further, determining the identities of the external objects can include but is not limited to identifying the external objects as any of: pedestrians, including types of pedestrians such as children or physically challenged persons; vehicles, including different types of vehicles such as emergency vehicles, or special purpose vehicles such as school buses; traffic light signals, including an indication of the traffic light state (e.g., red light, green light, amber light); traffic signage, including stop signs, yield signs, or traffic speed limitation indicators; pavement markings, including cross-walks, and lane divider indications; buildings, including commercial structures, residential structures, and temporary structures; utility structures, including telephone poles, power-lines, hydro poles, or cellular telephone towers; primary roadways including primary paved roadways such as streets, roads, or highways); secondary paved roadways including alleyways, parking lots, or drive-ways; and unpaved surfaces including waterways, woodlands, and fields.

In some implementations, the determination of the identities of the external objects can be based on different types of data including but not limited to: data originating from a subset of the external objects relating to the respective external objects (e.g., external objects, such as other vehicles, sending data relating to their respective identities); data originating from a subset of the external objects relating to other external objects (e.g., external objects, such as traffic signal cameras, sending data relating to the identities of other external objects); and data relating to the state of the external objects, originating from a remote data source that does not include the external objects (e.g., satellite imagery or traffic control center data related to the external objects).

At operation 7020, mobility states (a mobility state of each of the external objects) are determined. The mobility state for external objects can be based on the identities of the external objects and can include a determination of any of moveable states and immoveable states of the external objects. The mobility states can be based on whether the respective external objects are animate (e.g., a pedestrian), inanimate and moveable (e.g., vehicles), or inanimate and immoveable (e.g., buildings). Based on the mobility state of the external objects, a more accurate prediction of the external objects movement paths can be made. For example, an external object, such as a vehicle, that is stopped at a traffic signal indicating red (e.g., an indication for vehicles in front of the traffic signal to stop) is stationary, but is likely to move when the traffic signal indicates green (e.g., an indication for vehicles in front of the traffic light to proceed). Accordingly, based on the identity or identification data determination of the external object, a solution path will include the predicted path and timing of movement of the vehicle that is stopped at the traffic signal.

At operation 7030, the solution path overlay interface is modified or updated or further generated based on the determined mobility state of the external objects. The modifications to the solution path overlay interface can include indications, such as mobility indications, that indicate the mobility state of the external objects. The mobility indications can include: directional indicators, including arrows and other signifiers of the direction of the external objects; mobility state indicators associated with the external objects mobility state (e.g., immovable objects and moveable objects can be distinguished based on separate color coding such as red for animate objects, blue for inanimate immovable objects, yellow for inanimate moveable objects); and velocity indicators indicating the velocity of the respective external objects (e.g., an indicator that a vehicle is travelling at a velocity of twenty kilometers per hour).

Figure 8:
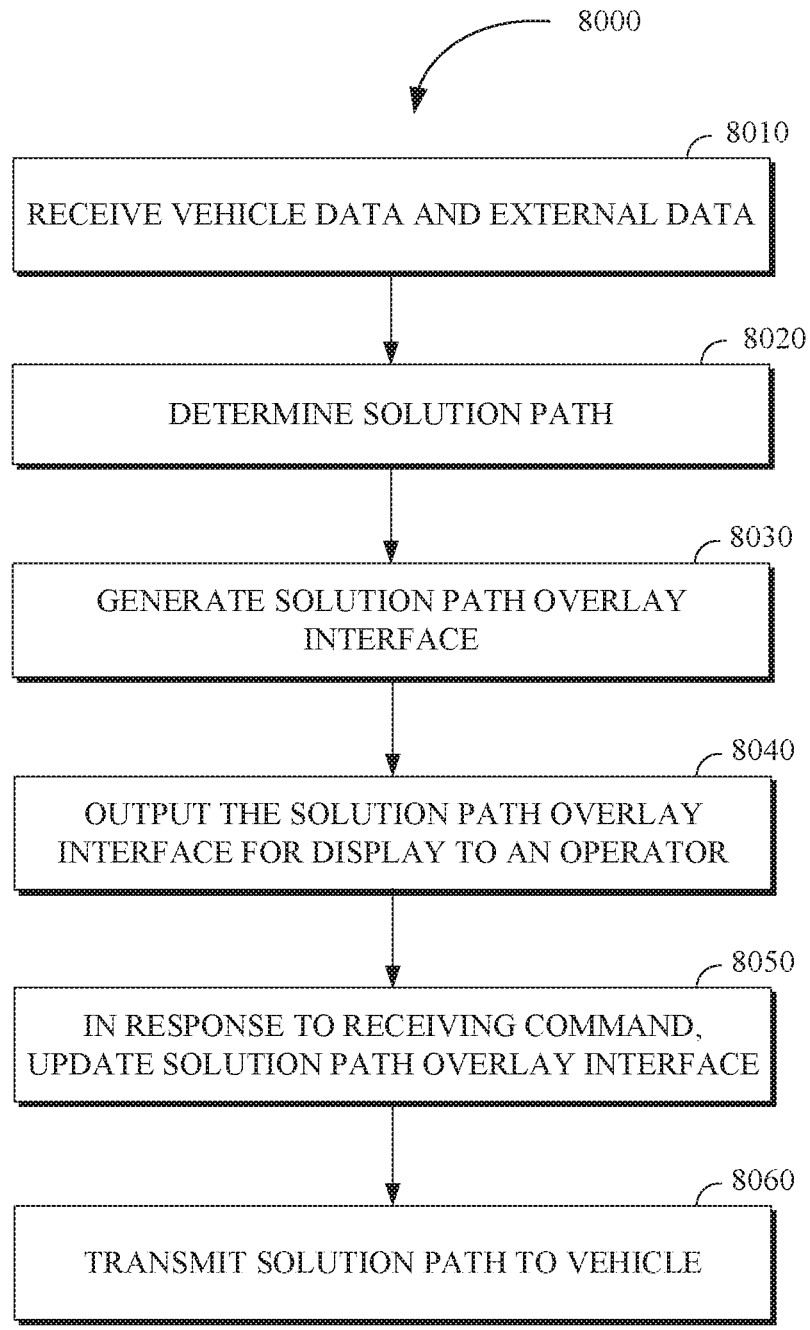
FIG. 8 is a flow chart of a method for generating a solution path overlay interface in accordance with the present disclosure.

FIG. 8 illustrates a method 8000 for generating a solution path overlay interface in accordance with the present disclosure. The method 8000 includes receiving, by a solution path overlay system of a controller apparatus (e.g., the controller apparatus 2410 of FIG. 2), vehicle data and external data from a vehicle control system of a vehicle, wherein the vehicle data includes a vehicle location and a vehicle destination (i.e., a location and a destination of a vehicle being monitored), via step 8010. The external data includes a location and a movement path for each of a plurality of external objects associated with or within a predetermined area of the vehicle. The method 8000 includes determining, by the solution path overlay system, a solution path between the vehicle location and the vehicle destination using the vehicle data and the external data, wherein the solution path does not intersect with the plurality of external objects, via step 8020. The method 8000 includes generating, by the solution path overlay system, the solution path overlay interface that includes a representation (e.g., a virtual model) of the vehicle traversing along the solution path and at least some of the plurality of external objects, via step 8030. The method 8000 includes outputting, by the solution path overlay system, the solution path overlay interface for display configured to receive a command from an operator of the solution path overlay interface, via step 8040. The command can comprise any of the operator rejecting, confirming, and updating/adjusting the solution path associated with the displayed solution path overlay interface. In response to receiving the command from the operator of the solution path overlay interface, the method 8000 includes updating, by the solution path overlay system, the solution path overlay interface according to the received command to provide an updated solution path, via step 8050, and transmitting, by the solution path overlay system, the updated solution path to the vehicle for execution, via step 8060.

In an implementation, any of the vehicle data and the external data includes sensor data from any of an optical sensor, a light detection and ranging sensor (LIDAR), a motion sensor, and an audio sensor. The method 8000 includes determining, by the solution path overlay system, a surface state within a predetermined distance of the vehicle based on the sensor data and generating, by the solution path overlay system, a surface image including a surface state indication based on the surface state, wherein the solution path overlay interface includes the surface state indication.

In an implementation, the method 8000 includes determining, by the solution path overlay system, traffic conditions using the sensor data and the movement paths of the plurality of external objects within a predetermined area, wherein a vehicle route of the vehicle is determined using the traffic conditions, wherein the vehicle route provides navigation data for the vehicle between the vehicle location and the vehicle destination. The vehicle location is based on map data that includes a geographical area of the vehicle and of the plurality of external objects, further wherein the solution path is displayed to an operator of the vehicle.

In an implementation, the method 8000 includes determining, by the solution path overlay system, identification data of the plurality of external objects based on any of the vehicle data and the external data; determining, by the solution path overlay system, mobility states of the plurality of external objects, wherein the mobility states include moveable states and immoveable states; and, updating, by the solution path overlay system and based on the mobility states, the solution path overlay interface to indicate moveable and immoveable external objects of the plurality of external objects. The identification data comprises any of pedestrians, vehicles, traffic light signals, traffic signage, pavement markings, buildings, primary roadways, and secondary roadways.

In an implementation, the method 8000 includes determining, by the solution path overlay system, a direction of regulated traffic flow based on any of traffic flow data and traffic flow indicators within the predetermined area, wherein the traffic flow data includes authorized traffic flow patterns for the plurality of external objects, wherein the solution path overlay interface includes an indication of the direction of regulated traffic flow; and, determining, by the solution path overlay system for each portion of the solution path, a buffer distance between the vehicle and each of the plurality of external objects, wherein the determining of the solution path comprises maintaining the buffer distance between the vehicle and each of the plurality of external objects.

Figure 9:
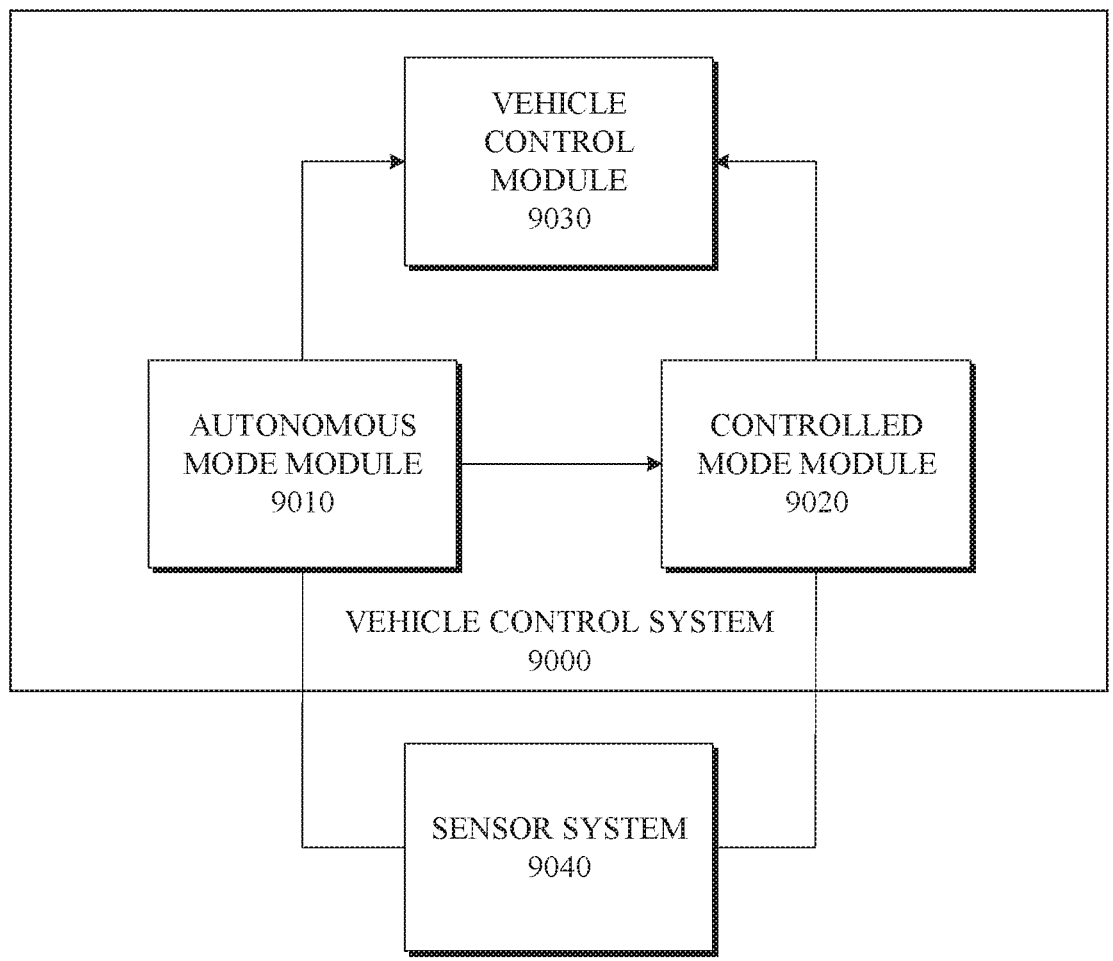
FIG. 9 is a diagram illustrating an example of a vehicle control system of an autonomous vehicle for controlling the autonomous vehicle via a controller apparatus in accordance with the present disclosure.

FIG. 9 illustrates a vehicle control system 9000 of an autonomous vehicle (e.g., vehicle 1000 of FIG. 1) for controlling the autonomous vehicle via a controller apparatus (e.g., controller apparatus 2410 of FIG. 2). During operation of the vehicle, the vehicle control system 9000 may either operate in an autonomous mode or a controlled mode. When operating in the autonomous mode, the vehicle control system 9000 determines the actions of the vehicle based on data collected by the vehicle (e.g., vehicle data and/or external data). The vehicle data and external data can also include data collected by third parties such as other vehicles or computer systems (e.g., IoT networks) that are transmitted to the vehicle via a communication network. When operating in a controlled mode, the vehicle control system 9000 transmits the data collected by the vehicle to a controller apparatus via a communication network (e.g., the electronic communication network 2300 of FIG. 2). In response to the data, the controller apparatus generates a solution path overlay interface and transmits a solution path to the vehicle. After receiving the solution path, the vehicle control system 9000 instructs the various systems of the vehicle (e.g., power source 1210, steering unit 1230, vehicle actuator 1240, and/or transmission 1220 of FIG. 1) to traverse the transportation network according to the solution path.

As the vehicle traverses the transportation network along the solution path, the vehicle continues to update the controller apparatus with the data being collected by the vehicle, such that the controller apparatus may determine whether the solution path needs to be adjusted due to the conditions changing. For example, as the vehicle traverses the solution path, objects, which may have previously been occluded, may appear in the field of view of the vehicle, which may prompt the solution path to change. The vehicle control system 9000 is described in greater detail below.

As shown in FIG. 9, the vehicle control system 9000 includes an autonomous mode module 9010, a controlled mode module 9020, and a vehicle control module 9030. In operation, the autonomous mode module 9010 determines actions for the vehicle to perform when operating in an autonomous mode, while the controlled mode module 9020 determines actions for the vehicle to perform when operating in a controlled mode.

Under normal operating conditions, the autonomous mode module 9010 receives sensor data from the sensor system 9040 to determine one or more actions to take. The sensor system 9040 may include any suitable types of sensors, including but not limited to optical sensors such as video camera sensors and light detection and ranging (LIDAR) sensors, audio sensors, location sensors such as global positioning system (GPS) sensors, motion sensors such as gyroscopes and accelerometers, temperature sensors, and any other suitable sensors. The autonomous mode module 9010 receives sensor data from the sensor system 9040 and determines vehicle data and external data based thereon. The autonomous mode module 9010 may operate in any suitable manner.

In some implementations, the autonomous mode module 9010 may implement one or more machine-learned models to determine the actions. The machine-learned models may include neural networks, Markov models, or other suitable models. The models receive the sensor data and determine an action based thereon. These models may be trained using training data, such that the actions determined by the models are based on the training data on which the models were trained. Thus, each action may have a confidence score associated with the action that indicates a degree of confidence that the model has in the determined action. The autonomous mode module 9010 outputs the action to the vehicle control module 9030, which outputs instructions to various vehicle systems (not shown) to control the vehicle.

In some cases, however, the autonomous mode module 9010 determines that the vehicle is encountering a scenario which the autonomous mode module 9010 cannot determine an action that has a requisite confidence score associated therewith. In such cases, the vehicle may have approached a scenario involving one or more external objects that the autonomous mode module 9010 was not trained to handle. For example, the vehicle may approach a construction zone, where the video sensors cannot capture what is behind the construction zone. When the autonomous mode module 9010 determines that it cannot output an action with a requisite confidence score, the autonomous mode module 9010 may notify the controlled mode module 9020. In doing so, the autonomous mode module 9010 may provide the sensor data to the controlled mode module 9020 which resulted in the unknown scenario.

Upon receiving notification from the autonomous mode module 9010, the controlled mode module 9020 may initiate a communication session with an operations center (e.g., operations center 2400 of FIG. 2). In some implementations, the controlled mode module 9020 initiates a communication session with the operations center by initiating a communication session with a controller apparatus (e.g., controller apparatus 2410 of FIG. 2) of the operations center. Upon initiating the communication session, the controlled mode module 9020 may transmit a request for a solution path and may additionally transmit sensor data collected by the sensor system 9040 and/or any other data that is collected by the vehicle. The data provided by the controlled mode module 9020 may include the vehicle data and/or external data.

In response to providing the data collected by the controlled mode module 9020, the controller apparatus provides a solution path to the controlled mode module 9020. The solution path may define a path along the transportation network that the vehicle is to traverse. In response to receiving the solution path, the controlled mode module 9020 may determine one or more actions to perform in order to traverse the transportation network according to the solution path. For example, the controlled mode module 9020 may determine that the vehicle must accelerate and veer to a certain direction. The controlled mode module 9020 may output the actions to the vehicle control module 9030.

In response to receiving one or more actions from either the autonomous mode module 9010 or the controlled mode module 9020, the vehicle control module 9030 executes the actions. In executing the action, the vehicle control module 9030 determines one or more commands to issue to one or more of the vehicle systems. For example, in response to an action to advance the vehicle and veer to the right, the vehicle control module 9030 may issue a first command to the power system of the vehicle to accelerate and may issue a second command to the steering system to turn right.

Figure 10:
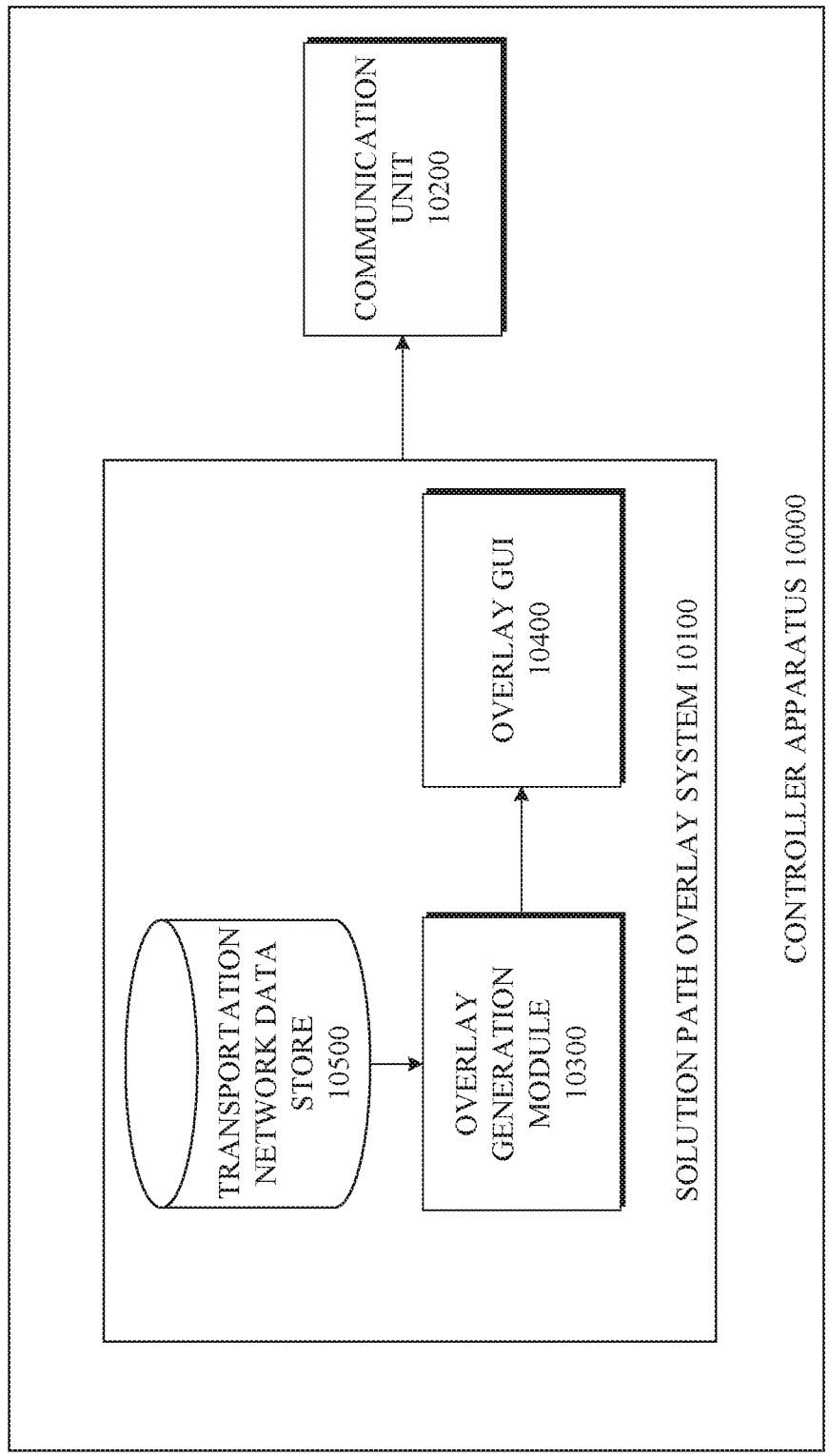
FIG. 10 is a diagram illustrating an example of a controller apparatus in accordance with the present disclosure.

FIG. 10 illustrates an example controller apparatus 10000. The controller apparatus 10000 may be the controller apparatus 2410 of FIG. 2 or any other suitable device that communicates solution paths to a vehicle via a communication network (e.g., the electronic communication network 2300 of FIG. 2). In the illustrated example, the controller apparatus 10000 may include a solution path overlay system 10100 and a communication unit 10200. The solution path overlay system 10100 may include an overlay generation module 10300, an overlay graphical user interface 10400 (overlay GUI), and a transportation network data store 10500. The overlay generation module 10300 and the overlay graphical user interface 10400 may be executed by one or more processors of the controller apparatus 10000. The transportation network data store 10500 may be stored in the storage system (i.e., memory) of the controller apparatus. The storage system may be a physical storage device in the controller apparatus or a network storage device that is accessed via a communication network.

The transportation network data store 10500 stores transportation network data. Transportation network data may be any data that describes features of a transportation network. The transportation network data may define roadways (e.g., streets, highways, bi-ways, alleys, etc.), directions of travels along the roadways, right of ways on the roadways, traffic signage (e.g., yield signs, stop signs, etc.), traffic light data, lane data (e.g., number of lanes, merge points, etc.), speed limits along the roadway, known obstacles, external objects, and other suitable data. In some implementations, the transportation network data may be organized in a database that is keyed by geolocations. In this way, the vehicle generation module 10300 may retrieve transportation network data relating to a path of a vehicle based on a location of the vehicle.

The overlay generation module 10300 receives a request for a solution path from a vehicle. The request for the solution path may include vehicle data and/or external data collected by the vehicle. For example, the request may include a geolocation of a vehicle, a route of the vehicle, a direction of the vehicle, speed of the vehicle, optical data (e.g., video and LIDAR data) collected by the vehicle, audio data, and any other suitable data. Alternatively, the overlay generation module 10300 may automatically determine that the vehicle requires a solution path for continued operation in response to receiving data collected by the vehicle. In response to the request or a determination that the vehicle requires a solution path, the overlay generation module 10300 determines a solution path (e.g., the solution path indicator 3022 of FIG. 3) and a corresponding solution path overlay (e.g., the solution path overlay indicator 3024 of FIG. 3) using the vehicle data and/or external data.

The overlay generation module 10300 then generates a solution path overlay interface (e.g., the solution path overlay interface 3000 of FIG. 3 or the solution path overlay interface 4000 of FIG. 4) using information including but not limited to the determined solution path, the corresponding solution path overlay, and the vehicle data and/or external data. The generated solution path overlay interface is outputted or transmitted by the overlay generation module 10300 to the overlay GUI 10400 for display (e.g., for display configured to receive at least one input or command from an operator of the solution path overlay system 10100). The solution path overlay interface may be a three-dimensional model (as shown in FIG. 4) of the vehicle traversing the solution path with respect to the transportation network in the vicinity of the vehicle. The three-dimensional model may also include other external objects (e.g., trees, buildings, etc.) of the environment surrounding the vehicle. The overlay generation module 10300 may utilize the transportation network data to generate the known environment of the vehicle (e.g., the roadway, the direction of traffic, and known obstacles). The overlay generation module 10300 may utilize the vehicle data and/or the external data to include the vehicle and any obstacles detected by the sensor system of the vehicle.

In some implementations, the overlay generation module 10300 retrieves transportation network data from the transportation network data store 10500 based on the geolocation of the vehicle. The overlay generation module 10300 may retrieve transportation network data relating to the current geolocation of the vehicle, geolocations relating to the upcoming route of the vehicle (e.g., the next 1000 feet), and geolocations of the most recently traversed portion of the route (e.g., the previous 50 feet). In these implementations, the overlay generation module 10300 obtains data relating to the roadway on which a vehicle is traveling on. For example, the overlay generation module 10300 may obtain transportation network data describing the roadway upon which the vehicle is traversing, the number of lanes on the roadway, the speed limits on the roadway, known obstacles on the roadway, traffic lights on the roadway, and traffic signs along the roadway.

The overlay GUI 10400 displays the solution path overlay interface that may include both the determined solution path and the corresponding solution path overlay via a graphical user interface. The solution path overlay interface may also display the transportation network in the general vicinity of the vehicle. The solution path overlay interface may allow an operator (or a computer) to analyze and/or update the solution path for the vehicle given the current situation of the vehicle. Furthermore, as the vehicle traverses the transportation network along the solution path, the overlay generation module 10300 may update the solution path overlay interface to illustrate the new location of the vehicle with respect to the solution path, as well as any objects that are newly detected in the vehicle data/external data, as the vehicle continues along the solution path. In doing so, the operator can update the solution path by interacting with or providing an input or command to the solution path overlay interface via the overlay GUI 10400.

The overlay GUI 10400 may display the solution path overlay interface to an operator (e.g., remote operator monitoring the vehicle). The solution path overlay interface may display the vehicle in relation to the transportation network. In addition, the solution path overlay interface may present any external objects that are in the vicinity of the vehicle along the transportation network. For example, the solution path overlay interface may include any vehicles (moving or parked), pedestrians, obstacles, road blocks, or any other potential object that may require the vehicle to navigate around. The operator may also be presented with additional information, such as the ambient temperature near the vehicle and any surface state information (e.g., wet road or icy road).

Once presented, via the overlay GUI 10400, with the solution path overlay interface including the determined solution path and the corresponding solution path overlay, an operator can generate a new/updated solution path (e.g., by providing a command to the overlay generation module 10300). In generating a new solution path, the overlay generation module 10300 may restrict the solution path so as to ensure a buffer distance (e.g., three feet) from any detected objects in the transportation network. Furthermore, the solution path may be of fixed dimensions, as the width of the vehicle is a constant value. In some implementations, the operator can draw a solution path using the solution path overlay interface. In other implementations, the operator can indicate one or more stop points and the overlay generation module 10300 may generate a solution path based on the stop points. For example, the overlay generation module 10300 may generate a solution path that passes through each stop points. The overlay generation module 10300 may further allow the operator to execute the solution path. Upon the operator electing to execute the solution path, the solution path overlay system 10100 may transmit the solution path to the vehicle for execution via the communication unit 10200.

In response to receiving the solution path, a vehicle control system (e.g., the vehicle control system 9000 of FIG. 9) of a vehicle (e.g., the vehicle 1000 of FIG. 1) can execute the solution path by determining one or more actions to perform in order to traverse the transportation network according to the solution path. The determined actions can be transmitted by the vehicle control system (e.g., either the autonomous mode module 9010, the controlled mode module 9020, or another module not shown in FIG. 9) to a vehicle control module (e.g., the vehicle control module 9030 of FIG. 9) for execution which provides one or more commands issued or transmitted to one or more vehicle systems of the vehicle. For example, in response to an action to advance the vehicle and veer to the right, the vehicle control module may issue a first command to the power system of the vehicle to accelerate and may issue a second command to the steering system to turn right.

The disclosed technology provides a solution path overlay generation system that more effectively generates solution path representations including images of an environment in which a vehicle, such as an autonomous vehicle, operates. The solution path overlay generation system can incorporate a variety of data including previously generated data and real-time data relating to conditions in the local environment of the vehicle, including sensor inputs, traffic flow patterns, and weather conditions. Accordingly, the solution path overlay generation system can more effectively represent an environment that a vehicle will traverse and thereby provide benefits including facilitated vehicle operation, enhanced situational awareness, and improved vehicle safety.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    receiving, by a solution path overlay system, vehicle data and external data from a vehicle control system of a vehicle, wherein the vehicle data is associated with the vehicle and includes a vehicle location and a vehicle destination, and the external data includes a location and a movement path for each of a plurality of external objects;
    determining, by the solution path overlay system, a solution path between the vehicle location and the vehicle destination using the vehicle data and the external data;
    generating, by the solution path overlay system, a solution path overlay interface that includes an indicator of the solution path, an indicator of a solution path overlay that corresponds to the solution path, an indicator of a roadway, a representation of the vehicle traversing along the solution path via the roadway, and an indicator for each of at least some of the plurality of external objects, the solution path overlay representing outer edges of the solution path based on a width of the vehicle;
    outputting, by the solution path overlay system, the solution path overlay interface for display to an operator of the solution path overlay interface;
    in response to detecting a change associated with the movement path of any of the plurality of external objects, receiving, by the solution path overlay system, a command from the operator of the solution path overlay interface, the command including a drawing gestured directly onto the solution path overlay interface and an indication of one or more stop points;
    updating, by the solution path overlay system, the solution path overlay interface based on the received command to provide an updated solution path and an updated solution path overlay that corresponds to the updated solution path; and
    transmitting, by the solution path overlay system, the updated solution path and the updated solution path overlay to the vehicle for execution to navigate to the vehicle destination.

2. The method of claim 1, wherein any of the vehicle data and the external data includes sensor data from any of an optical sensor, a light detection and ranging sensor (LIDAR), a motion sensor, and an audio sensor.

3. The method of claim 2, further comprising:
    determining, by the solution path overlay system, a surface state within a predetermined distance of the vehicle based on the sensor data; and
    generating, by the solution path overlay system, a surface image including a surface state indication based on the surface state, wherein the solution path overlay interface includes the surface state indication.

4. The method of claim 2, further comprising:
    determining, by the solution path overlay system, traffic conditions using the sensor data and movement paths of the plurality of external objects within a predetermined area, wherein a vehicle route of the vehicle is determined using the traffic conditions, wherein the vehicle route provides navigation data for the vehicle between the vehicle location and the vehicle destination.

5. The method of claim 4, further comprising:
    determining, by a solution path overlay system, a direction of regulated traffic flow based on any of traffic flow data and traffic flow indicators within the predetermined area, wherein the traffic flow data includes authorized traffic flow patterns for the plurality of external objects, wherein the solution path overlay interface includes an indication of the direction of regulated traffic flow.

6. The method of claim 1, wherein the vehicle location is based on map data that includes a geographical area of the vehicle and of the plurality of external objects, further comprising:
    displaying the updated solution path to an operator of the vehicle.

7. The method of claim 1, further comprising:
- determining, by the solution path overlay system, identification data of the plurality of external objects based on any of the vehicle data and the external data;
- determining, by the solution path overlay system, mobility states of the plurality of external objects, wherein the mobility states include moveable states and immoveable states; and
- updating, by the solution path overlay system and based on the mobility states, the solution path overlay interface to indicate the moveable states and the immoveable states of the plurality of external objects.

8. The method of claim 7, wherein the identification data comprises any of pedestrians, vehicles, traffic light signals, traffic signage, pavement markings, buildings, primary roadways, and secondary roadways.

9. The method of claim 7, further comprising:
- determining, by the solution path overlay system for each portion of the solution path, a buffer distance between the vehicle and each of the plurality of external objects, wherein the determining of the solution path further comprises dynamically maintaining the buffer distance between the vehicle and each of the plurality of external objects.

10. A solution path overlay system comprising:
- a memory; and
- a processor configured to execute instructions stored in the memory to:
  - receive vehicle data and external data from a vehicle control system of a vehicle, wherein the vehicle data is associated with the vehicle and includes a vehicle location and a vehicle destination, and the external data includes a location and a movement path for each of a plurality of external objects;
  - determine a solution path between the vehicle location and the vehicle destination using the vehicle data and the external data;
  - generate a solution path overlay interface that includes an indicator of the solution path, an indicator of a solution path overlay that corresponds to the solution path, an indicator of a roadway, a representation of the vehicle traversing along the solution path via the roadway, and an indicator for each of at least some of the plurality of external objects, the solution path overlay representing outer edges of the solution path based on a width of the vehicle;
  - output the solution path overlay interface for display to an operator of the solution path overlay interface;
  - in response to detecting a change associated with the movement path of any of the plurality of external objects, receive a command from the operator of the solution path overlay interface, the command including a drawing gestured directly onto the solution path overlay interface and an indication of one or more stop points;
  - update the solution path overlay interface based on the received command to provide an updated solution path and an updated solution path overlay that corresponds to the updated solution path; and
  - transmit the updated solution path and the updated solution path overlay to the vehicle for execution to navigate to the vehicle destination.

11. The solution path overlay system of claim 10, wherein any of the vehicle data and the external data includes sensor data from any of an optical sensor, a light detection and ranging sensor (LIDAR), a motion sensor, and an audio sensor.

12. The solution path overlay system of claim 11, wherein the processor is further configured to execute instructions stored in the memory to:
- determine a surface state within a predetermined distance of the vehicle based on the sensor data; and
- generate a surface image including a surface state indication based on the surface state, wherein the solution path overlay interface includes the surface state indication.

13. The solution path overlay system of claim 11, wherein the processor is further configured to execute instructions stored in the memory to:
- determine traffic conditions using the sensor data and movement paths of the plurality of external objects within a predetermined area, wherein a vehicle route is determined using the traffic conditions, wherein the vehicle route provides navigation data for the vehicle between the vehicle location and the vehicle destination.

14. The solution path overlay system of claim 11, wherein the vehicle location is based on map data that includes a geographical area of the vehicle and of the plurality of external objects, the processor further configured to execute instructions stored in the memory to:
- display the updated solution path to an operator of the vehicle.

15. The solution path overlay system of claim 11, wherein the processor is further configured to execute instructions stored in the memory to:
- determine identification data of the plurality of external objects based on any of the vehicle data and the external data;
- determine mobility states of the plurality of external objects, wherein the mobility states include moveable states and immoveable states; and
- update, based on the mobility states, the solution path overlay interface to indicate the moveable states and the immoveable states of the plurality of external objects.

16. A non-transitory computer-readable storage medium including program instructions executable by one or more processors of a solution path overlay system that, when executed, cause the one or more processors to perform operations, the operations comprising:
- receiving vehicle data and external data from a vehicle control system of a vehicle, wherein the vehicle data is associated with the vehicle and includes a vehicle location and a vehicle destination, and the external data includes a location and a movement path for each of a plurality of external objects;
- determining a solution path between the vehicle location and the vehicle destination using the vehicle data and the external data;
- generating a solution path overlay interface that includes an indicator of the solution path, an indicator of a solution path overlay that corresponds to the solution path, an indicator of a roadway, a representation of the vehicle traversing along the solution path via the roadway, and an indicator for each of at least some of the plurality of external objects, the solution path overlay representing outer edges of the solution path based on a width of the vehicle;

outputting, by the solution path overlay system, the solution path overlay interface for display to an operator of the solution path overlay interface;

in response to detecting a change associated with the movement path of any of the plurality of external objects, receiving, by the solution path overlay system, a command from the operator of the solution path overlay interface, the command including a drawing gestured directly onto the solution path overlay interface and an indication of one or more stop points;

updating, by the solution path overlay system, the solution path overlay interface based on the received command to provide an updated solution path and an updated solution path overlay that corresponds to the updated solution path; and transmitting the updated solution path and the updated solution path overlay to the vehicle for execution to navigate to the vehicle destination.

17. The non-transitory computer-readable storage medium of claim 16, wherein any of the vehicle data and the external data includes sensor data from any of an optical sensor, a light detection and ranging sensor (LIDAR), a motion sensor, and an audio sensor.

18. The non-transitory computer-readable storage medium of claim 17, the operations further comprising:
    determining a surface state within a predetermined distance of the vehicle based on the sensor data; and
    generating a surface image including a surface state indication based on the surface state, wherein the solution path overlay interface includes the surface state indication.

19. The non-transitory computer-readable storage medium of claim 17, the operations further comprising:
    determining traffic conditions using the sensor data and movement paths of the plurality of external objects within a predetermined area, wherein a vehicle route is determined using the traffic conditions, wherein the vehicle route provides navigation data for the vehicle between the vehicle location and the vehicle destination.

20. The non-transitory computer-readable storage medium of claim 17, the operations further comprising:
    determining identification data of the plurality of external objects based on any of the vehicle data and the external data;
    determining mobility states of the plurality of external objects, wherein the mobility states include moveable states and immoveable states; and
    updating, based on the mobility states, the solution path overlay interface to indicate the moveable states and the immoveable states of the plurality of external objects.

* * * * *